3,181,165
PNEUMATIC SERVO SYSTEM
Roy L. Van Winkle, Edmond, and William L. Lankford, Jr., and Irvin M. Carpenter, Oklahoma City, Okla., assignors to The Geolograph Company, Oklahoma City, Okla., a corporation of Oklahoma
Filed Dec. 26, 1962, Ser. No. 247,084
2 Claims. (Cl. 346—33)

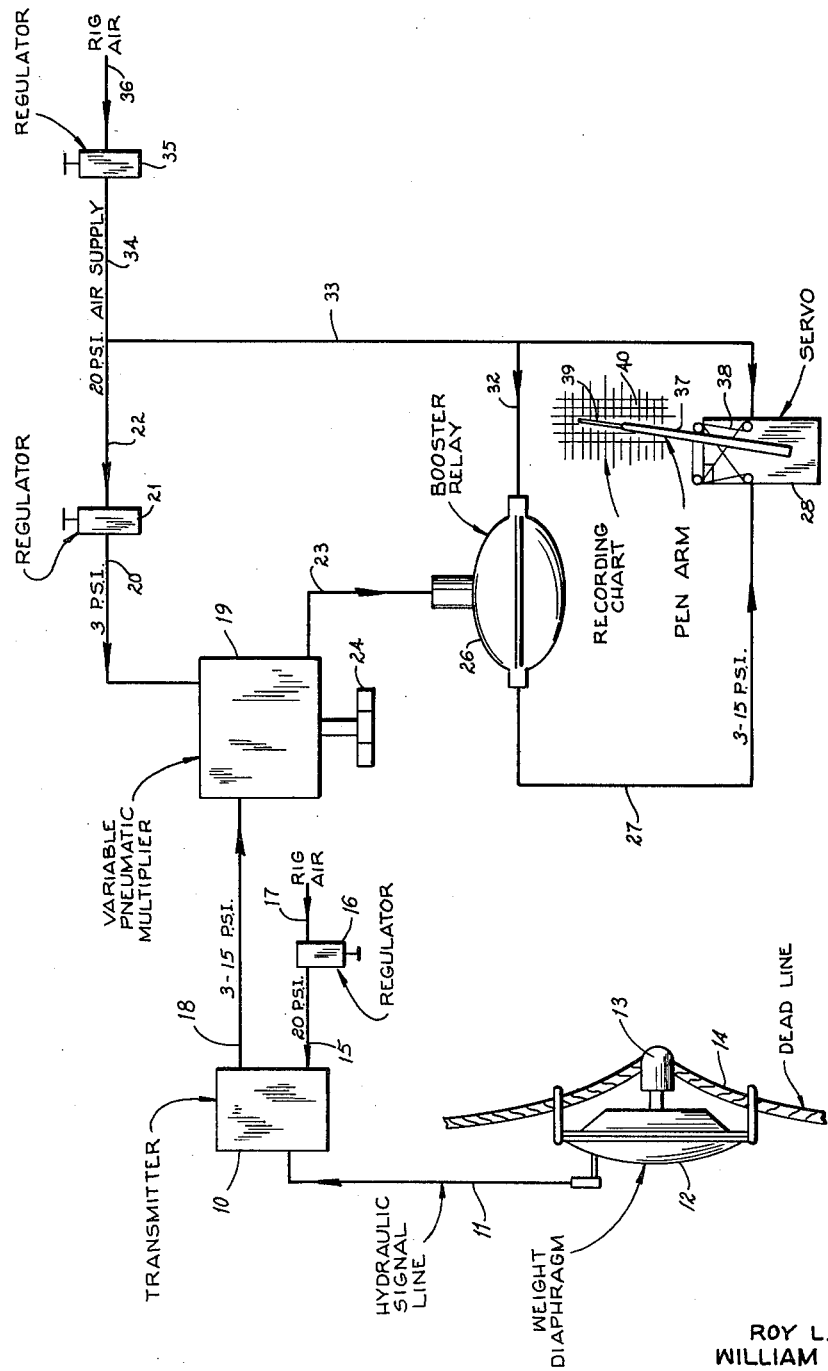

The present invention relates generally to recording apparatus and, more particularly, to pneumatic servo systems adapted to provide the desired recordings.

Although the present invention will be described herein in particular relation to the recording of a given variable whose value is measured and/or recorded in connection with the drilling of oil wells and the like, it should be understood that the employment of the present invention is by no means limited to this particular variable.

It is a principal object of the present invention to provide a system for recording variations in weight on a drill string employing pneumatic servo principles.

Other and further objects and advantageous features of the present invention will hereinafter more fully appear in connection with a detailed description of the drawing which is a schematic diagram showing one form of the present invention and illustrating, for example, a circuit which may be employed for recording the weight on a drill string.

Referring to the drawings in detail, there is shown a pneumatic system for recording the weight on a drill string. A transmitter 10, capable of converting variable hydraulic pressure at its input into a correspondingly variable pneumatic pressure at its output is connected by means of conduit 11 (containing hydraulic fluid) to a weight diaphragm 12, for example, the latter having a sensing element 13 bearing against a portion of a dead line 14. The tension in the dead line will be proportional to the weight on the drill bit; also, the weight diaphragm 12 is so constructed that the pressure created therein, as a result of the sensing element 13 bearing against the dead line, will be proportional to the tension in the dead line. A 20 p.s.i. pneumatic reference source is also fed into the transmitter from the conduit 15 through the pressure regulator 16 which is adjustable to create the 20 pound pressure source. The regulator connects to a source of rig air (not shown) by means of conduit 17. An output pneumatic pressure of 3 to 15 p.s.i. is transmitted from the transmitter 10 through the conduit 18.

The transmitter 10 can be any one of several well known types. For example, it is possible to employ, in the circuit shown in FIGURE 1, a Moore Model 173 pneumatic pressure transmitter such as described and illustrated on page 10 of the Moore Products Catalog of 1962. Briefly stated, however, the transmitter will have therein a helical tube (or Bourdon tube, not shown) which connects directly with the hydraulic pressure, for example, such as in the hydraulic signal line 11. The transmitter will also have therein a pressure nozzle (not shown) adapted to be covered at least partly by a flapper (not shown) which is connected to the Bourdon tube or helix. Thus, as the position or expansion of the helix or Bourdon tube changes with the change in hydraulic pressure, the position of the flapper will change so as to reflect a corresponding change in back pressure through the nozzle. The nozzle itself will be a means for controlling the output pressure of another valve (not shown), this output pressure being between 3 and 15 p.s.i. depending upon the value of the hydraulic pressure fed to the input of the transmitter.

The other end of the conduit 18 from the transmitter 10 connects with a pneumatic multiplier 19, the details of which will be disclosed hereinafter. A reference pressure of 3 p.s.i. is fed into the multiplier 19 through the conduit 20, the latter connecting in series with a variable regulator 21 and a conduit 22. The conduit 22 contains therein a 20 p.s.i. source of pressure as will hereinafter appear. The output from the multiplier 19 is fed into a booster relay 26 through the conduit 23. It might be mentioned here that the booster relay is actually a part of the pneumatic multiplier 19; however, this will appear more clearly hereinafter in connection with a more detailed description of the pneumatic multiplier. A control handle 24 is provided on the multiplier 19 to permit a variation between the input and output pressures in the conduits 18 and 23, respectively. The output from the booster relay 26 is fed through the conduit 27 from a servo 28. A 20 p.s.i. source of air is fed to the servo 28 and the booster relay 26 through conduits 31 and 32, respectively. Conduits 31 and 32 connect in common with conduit 33 and in series with conduit 34, regulator 35 and the source of rig air 36. It should be noted here that the conduit 22 previously described connects with the conduit 34.

The overall pneumatic multiplier comprising the element specifically designated as pneumatic multiplier 19 plus the booster relay 26 is a standard purchased item. For example, the pneumatic multiplier can be the Moore ratio-control system described on page 6, Bulletin 5019 of the Moore Products Catalog referred to above. As described above, the input pneumatic signal through the conduit 18 varies between 3 and 15 p.s.i. Also, the pneumatic signal from the conduit 27 to the servo 28 varies between 3 and 15 p.s.i. However, within the range of 3 to 15 p.s.i. it may well happen that a pressure differential of 1 pound in conduit 18 should be reflected as a differential of 1.5 or 2 pounds in a conduit 27 in order that the servo 28 (later to be described) will operate in accordance with the graduations on the chart supplied therefor. Thus, by adjusting the control knob 24, the pressure differential in conduit 18 can be amplified by a factor ranging between 0.2 and 2.0 in the output line 27. The advantage of this will appear hereinafter.

The servo 28 is a recording device having a pivotally mounted recording arm 37 mounted therein and movable from a fixed reference position as represented by the position of the arm 37 when a 3 pound input signal is introduced into the servo 28 through the line 27. The arm 37 is adapted to be deflected from this reference position when the input pressure exceeds 3 p.s.i. A cable 38 attached to the motive means (not shown) in the servo 28 is connected to the pen arm 37 so as to deflect the latter. A pen 39 is connected to the outer end of the arm 37 and a chart 40 (only a portion of which is shown) is adapted to be placed in such a position as to be contacted by the pen 39. A suitable servo has been found to be a Taylor Servomatic Motor, 90 J Series as illustrated in Catalog 4B201, Issue 2, of the Taylor Instrument Companies TP-618.

One of the advantages of the above circuit is that it may be readily adapted to record the weight of a drill string regardless of the number of lines used to support the drill string. For example, it is well known that the drill string is supported by a line or cable passing around various sheaves in the crown block and various corresponding sheaves in the traveling block on the upper end of the drill string. As the weight of the drill string increases during the drilling operation, it sometimes becomes necessary to reeve the cable or line through additional sheaves on the two blocks referred to above so as to change, for example, from eight lines to ten lines. In such an instance, it should be obvious that the tension in the dead line 14 when changing from eight lines to ten lines would not properly reflect the same weight in each instance. Therefore, when the number of lines has been changed, it is merely necessary to adjust the knob 24 so as to bring the recording pen 39 to the proper position on the chart after which it will then record the exact changes in weight.

Whereas the present invention has been described in particular relation to the drawing attached hereto, it should be understood that other and further modifications, apart from those shown or suggested herein may be made within the spirit and scope of this invention.

What is claimed is:

1. A pneumatic recording system for recording the instaneous value of a given variable comprising a pneumatic transmitter having an input responsive to changes in value of said given variable, means within said transmitter for converting its input into a correspondingly variable output pneumatic signal falling within a predetermined range of pneumatic pressures, a pneumatic multiplier having its input connected with the output pneumatic signal from said pneumatic transmitter, said pneumatic multiplier providing an output pneumatic signal variable over said predetermined range of pressures, means within said variable pneumatic multiplier for amplifying at its output the input pneumatic signal to said multiplier, a pneumatic recording device having a pen arm pivotally mounted therein and movable from a given reference position, said pneumatic recording device having an inlet connected to the output from said variable pneumatic multiplier, means within said pneumatic recording device for converting the input pneumatic signal into a corresponding deflection of said pen arm away from said reference position, and means supplying air under pressure to said system for operating the same.

2. A pneumatically operated weight-recording system comprising a dead line whose tension reflects the weight exerted on said line, a weight sensing device containing hydraulic fluid therein and having a sensing element bearing against said dead line to change the pressure of said hydraulic fluid in said sensing device in accordance with changes in tension in said dead line, a pneumatic pressure transmitter having an input hydraulic line and an output pneumatic signal line, means connecting said input hydraulic line to said sensing device so as to transmit the pressure in the hydraulic fluid within said sensing device to said transmitter, means within said transmitter for transforming the changes in pressure in said hydraulic fluid into corresponding changes in pneumatic pressure in the output signal line from said transmitter, means supplying a source of air under pressure to operate said transmitter, a pneumatic multiplier connected to said signal line from said transmitter, means supplying a source of air under pressure to said pneumatic multiplier for operating the same, an output from said pneumatic multiplier providing air under pressure within a predetermined pressure range, means within said pneumatic multiplier for changing the ratio of output pressure to input pressure, a recording device having mounted therein a pen arm pivotal from a reference position, an input signal line to said recording device, means connecting said input signal line for said recording device to the output of said variable pneumatic multiplier, means within said recording device for deflecting said pen arm away from its reference position an amount commensurate with the value of the input pneumatic signal to said recording device, and means for supplying a source of air under pressure to said recording device for operating the same.

References Cited by the Examiner

UNITED STATES PATENTS

| | | | |
|---|---|---|---|
| 814,905 | 3/06 | Ericson | 346—33 |
| 1,175,050 | 3/16 | Daft | 346—33 |
| 1,503,078 | 7/24 | Wallbillich | 346—73 |
| 1,795,623 | 3/31 | Thompson et al. | 73—144 |
| 2,099,955 | 11/37 | Edwards | 73—144 |
| 2,703,008 | 3/55 | Seljos et al. | 73—151 |
| 3,010,777 | 11/61 | Melton et al. | 346—33 |

LEYLAND M. MARTIN, *Primary Examiner.*